Oct. 22, 1968    H. W. FALL ETAL    3,406,470
DRAFT FRAMES FOR SCRAPERS
Filed May 25, 1966    4 Sheets-Sheet 1
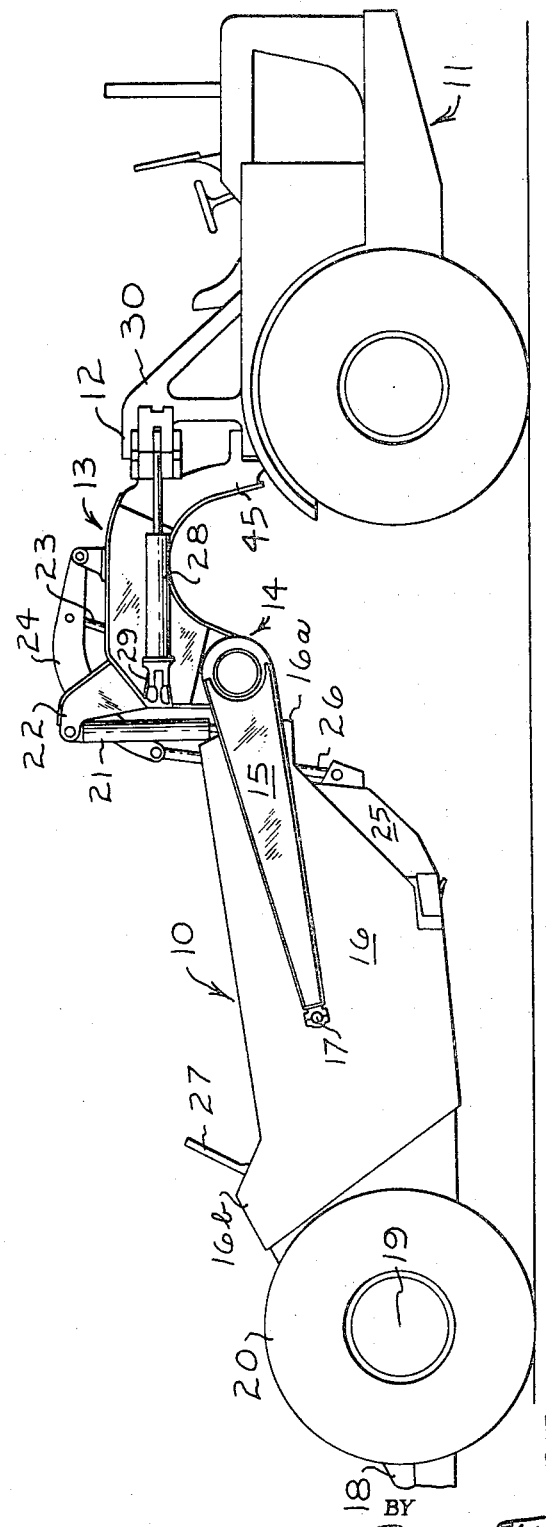
INVENTORS.
HARRY W. FALL
LAWRENCE J. MILLER
BY
Fryer, Tjensvold, Feix & Phillips
ATTORNEYS

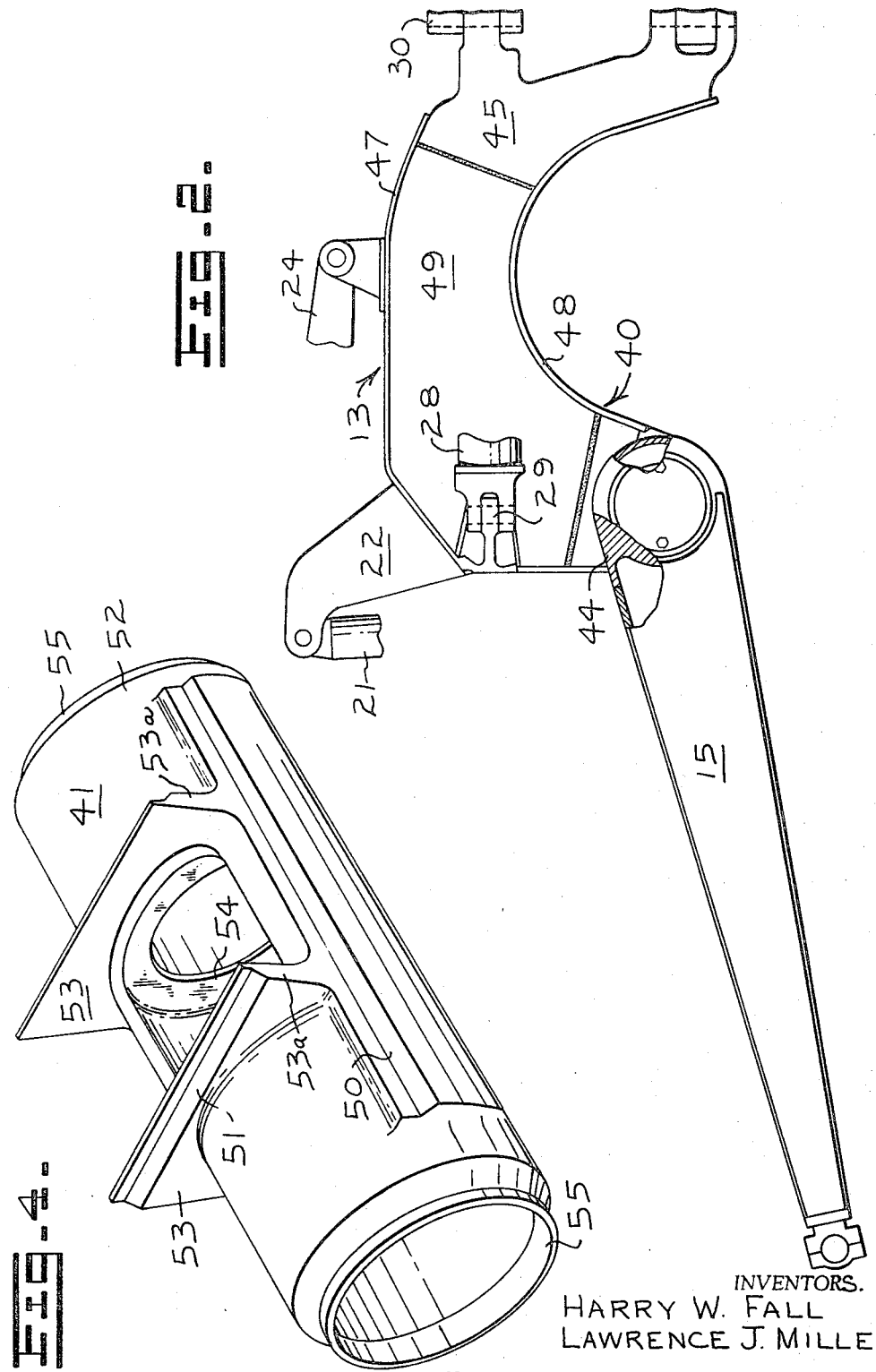

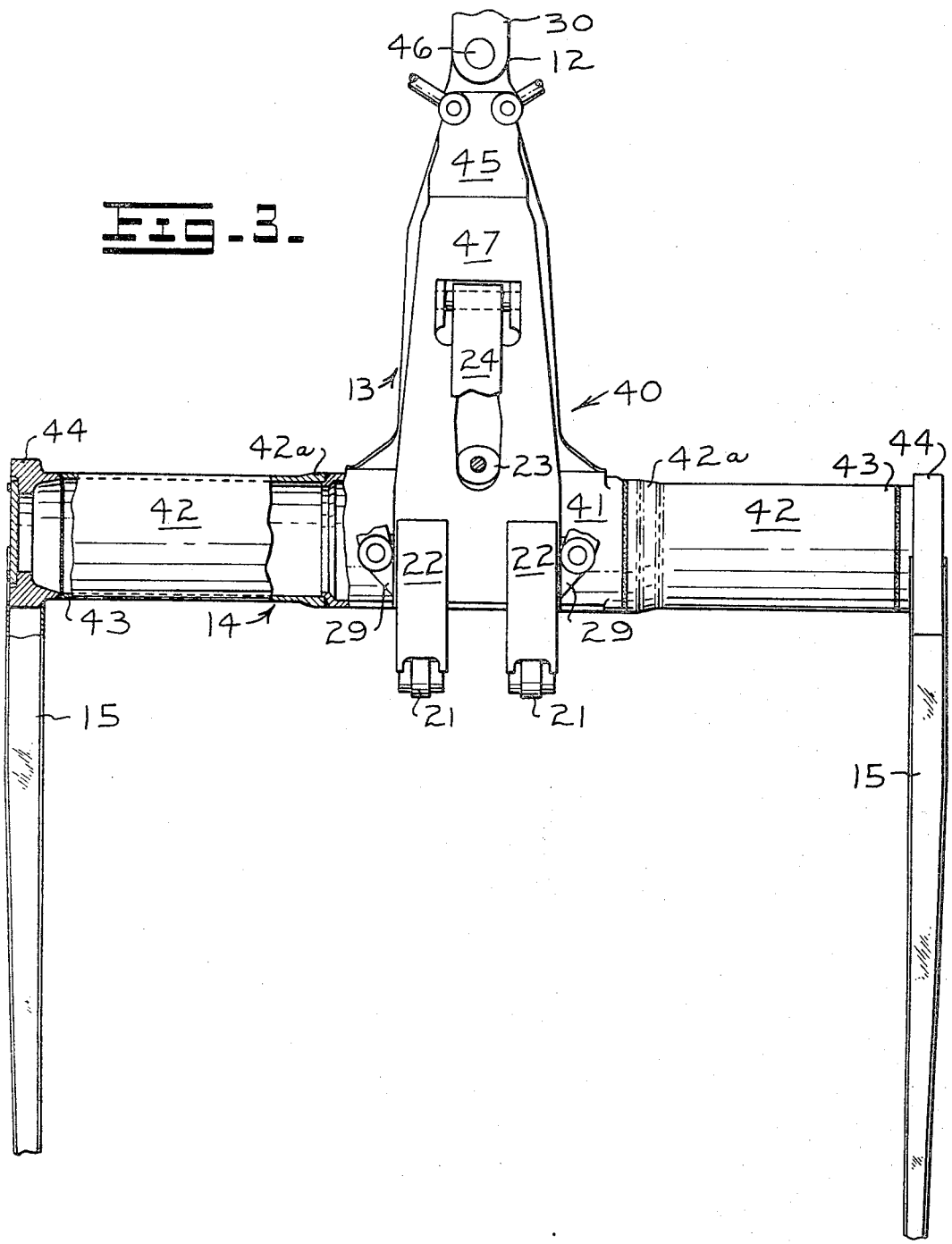

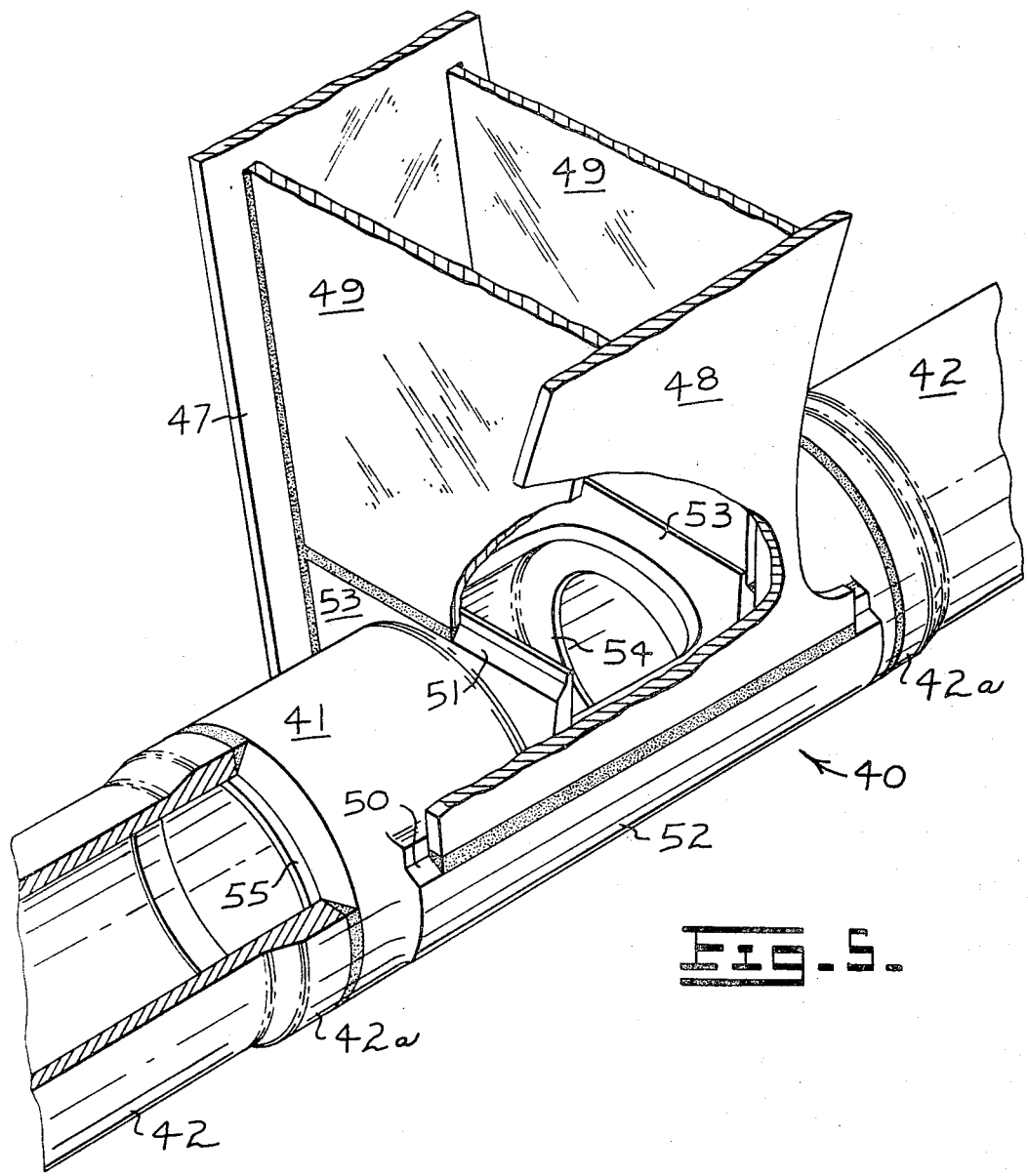
INVENTORS.
HARRY W. FALL
LAWRENCE J. MILLER

United States Patent Office 3,406,470
Patented Oct. 22, 1968

3,406,470
DRAFT FRAMES FOR SCRAPERS
Harry W. Fall, Morton, and Lawrence J. Miller, Joliet, Ill., assignors to Caterpillar Tractor Co., Peoria, Ill., a corporation of California
Filed May 25, 1966, Ser. No. 552,860
7 Claims. (Cl. 37—129)

ABSTRACT OF THE DISCLOSURE

In conventional earthmoving scrapers employing a rigid draft frame having a hitch member connected to a gooseneck and the gooseneck in turn connected to the central portion of the transverse spreader tube which has draft arms connected to the outboard ends for pivotally attaching the draft frame to the bowl, an improved frame employing a casting in the central portion of the transverse spreader tubes so the gooseneck can be joined to the transverse spreader tube with a plurality of flat joints to better distribute the loads interchanged between the rigidly connected gooseneck and transverse spreader tube.

---

This invention relates to large, earthmoving scrapers which have an earth-carrying bowl, and more particularly to an improved support structure between the bowl and a tractor which draws it.

In many earthmoving scrapers, the bowl has a blade on the front, bottom edge which can be lowered with the front of the bowl for cutting through the earth for filling the bowl by moving the machine forward. The rear of the bowl is usually supported on a wheeled axle, and a structure must be provided at the front of the bowl through which the bowl can be pulled by a tractor and which will also allow the blade edge of the bowl to be raised and lowered.

Commonly, the supporting structure mentioned above, which has the general appearance of a wishbone, is referred to as a draft frame. Its purpose is to provide a supporting structure for the front of the bowl, and a connecting link between it and a tractor. Generally, the tractor is pivotally connected to the draft frame through a hitch for steering the machine, and much of the support of the bowl and its contents must be accomplished through the draft frame via the hitch connection to the tractor.

Generally the draft arrangement requires that the draft frame be fabricated to withstand many and diverse loads of relatively large magnitude. The three major forces acting on the draft frame through the hitch connection are longitudinal pull, side-to-side steering forces, and vertical loading as a result of the weight of the rear portion of the machine and its contents. As a result of these loading factors, a great deal of strain is placed on the draft frame which often causes it to fail. Commonly, much of the damage to the draft frame results from steering loads developed during high speed return with the scraper empty. Also the vertical loads resulting from the overall weight of the machine and its contents, can be severe where a loaded scraper is subjected to bouncing over rough terrain.

Because of the magnitude and diverse direction of the loads placed on the draft frame during normal operations of a scraper, there has been a high incidence of structural failures in these parts. Cost, size and weight restrictions have heretofore prevented a satisfactory solution to this common failing in scrapers. Wrapper plates have been used to reinforce the draft frame structure, but their use has not eliminated failure of these structures. Other attempts to correct this failing have not met with success.

Accordingly, it is an object of the present invention to provide a new draft frame structure for earthmoving scrapers which has an improved service life over the ones conventionally available, and which still is within the desired cost, size and weight ranges.

The above objects among others, as well as numerous advantages, can be accomplished by fabricating a draft frame with a load distributing central casting around which the frame is fabricated so that the welded joints between the contiguous parts are disposed away from areas of high and diverse stresses. Of course, the orientation of the welded joints themselves can be arranged to more uniformly distribute the loads across each joint through the use of such a casting.

Further and more specific objects and advantages of the invention and the manner in which it is carried into practice are disclosed in the following specification interpreted with reference to the accompanying drawings wherein:

FIG. 1 is an elevation of a conventional four-wheeled scraper employing a draft frame;

FIG. 2 is an elevation of the draft frame removed from a scraper with parts broken away to show greater detail;

FIG. 3 is a plan view of the draft frame shown in FIG. 2 with parts broken away to show its internal construction detail;

FIG. 4 is a perspective of the load distributing central casting around which the novel draft frame is fabricated; and FIG. 5 is a fragmentary perspective showing the incorporation of the load distributing casting in the draft frame.

In FIG. 1 a conventional four-wheeled scraper 10 is illustrated which is typical of those employing a draft frame structure. The tractor 11 is swingably connected through a hitch 12, gooseneck 13, spreader tube 14 with cooperating draft arms 15, and hydraulic jacks to the bowl 16 of the scraper. The end of the draft arms are connected to the side walls of the bowl through pivotal connections 17 on opposite sides of the bowl. The rear 18 of the scraper is supported on axle 19 with wheels 20 in a conventional manner.

Hydraulic jacks 21, connected between a support 22 on the gooseneck and the forward end 16a of the scraper bowl, are used to raise and lower the front blade edge of the bowl for loading it. Another jack 23 cooperates with an arcuate member 24 to raise and lower the apron 25 through a link 26, opening and closing the front of the scraper bowl. An ejector 27 is located at the rear 16b of the scraper bowl and can be moved forwardly to eject the contents of the bowl when the apron has been raised.

To steer such a scraper as shown in FIG. 1 hydraulic jacks 28 are fastened between lugs 29 on the gooseneck and the hitch structure 30 on the wheeled tractor, one being on each side of the gooseneck. By cooperative action of these jacks, the two-wheeled tractor is swivelled about hitch 12 for steering the machine.

It can be appreciated from the above-described arrangement that the draft frame connecting the bowl 16 with tractor 11 is subjected to large magnitudes of stress loading in diverse directions during the normal operation of the machine. It is for this reason that a large incidence of failures occur in the draft frames of conventional scrapers and the above description of a conventional scraper has been related to show the environment in which the improved draft frame structure is designed to be used.

The principal parts of the improved draft frame 40 of this invention, which is shown in elevation in FIG. 2 and plan in FIG. 3, include the gooseneck 13 connected to a load distributing casting 41 and cross tubes 42 which are joined to opposite sides of the casting to form the transverse spreader tube 14, usually by welded joints. The outboard ends 43 of the cross tubes are equipped with assemblies 44 for mounting the draft arms 15 which extend radially from the assemblies in parallel relationship for attachment to the side walls of the bowl 16. The gooseneck has its opposite end connected to a hitch casting 45 which cooperates with the hitch structure 30 on tractor 11 to form the hitch 12, being swingably secured thereon with a hinge pin.

The gooseneck is fabricated from rolled plates. Generally the spanning gooseneck structure between the load distributing casting 41 and the hitch casting 45 is composed of an upper flange plate 47 and a lower flange plate 48 which are separated by spaced apart web plates 49, all of which are welded together in a strong box-beam construction. Using the castings it is possible to attach the gooseneck in a manner which will more evenly distribute the stress loads developed across the joints, and also provide a more desirable contact area between the gooseneck plates and the several castings.

In a conventional draft frame, the gooseneck 13 is usually welded centrally on a unitary spreader tube which extends completely across the bowl, after being patterned to fit the circumferential periphery of the tube. In this manner the structural integrity of the transverse spreader tube is preserved. However, the joints between the spreader tube and the gooseneck have a high failure rate because of the relatively sharp corners and abrupt changes in cross-section between the plates of the gooseneck and their connection to the transverse spreader tube. The metallurgical changes at the joints caused by the welding operation also are responsible for weakness in conventional joints.

As can be seen in FIG. 5 the novel load distributing casting 41 replaces the conventional central structure in a draft frame and provides integral shoulders 50 and mating faces 51 for connecting flange plates 47 and 48 and web plates 49, respectively, to the load distributing casting. This casting forms a cap on one end of the box-beam construction of the gooseneck and is usually butt welded to the plates along the contiguous faces to form a strong, durable joint therebetween. Through the use of these mating faces, the area of the individual joints can be conveniently increased, more efficient butt welds can be used to increase strength and all the joints can be generally oriented perpendicular or parallel to one another for greater structural integrity. Also, the joints between the flange plates and the web plates can be offset (lapped) relative to one another so that they do not occur in the same general plane of shear which also improves the structural integrity of the joints.

The preferred construction of the novel load distributing casting 41 is shown in FIG. 4 having a generally hollow cylindrical body 52 which is reinforced by increasing the wall thickness in areas where high stress will be encountered. Hollow construction is used to keep the weight down and provide access through the inside of the frame for control systems.

Centrally located on the body are two spaced apart, projecting radial flanges 53, which have mating faces 51 for connecting them to web plates 49. Located axially along the outside of the body on opposite sides of the projecting flanges are shoulders 50 for receiving the ends of the flange plates 47 and 48. Since the radial flanges of the casting form extensions of the web plates when connected thereto, the flange plates of the gooseneck may be welded to the side edges 53a of the radial flanges and also to the shoulders located axially along the body. This forms an excellent connection to the casting. In order that the projecting flanges can carry the loads induced thereon, each has a structural support web 54 directly beneath them, projecting into the interior of the hollow body within the casting to help distribute the loads induced thereon within the casting.

It can be seen from the drawings that the primary shoulders 50 for connecting the flange plates 47 and 48 are perpendicular and offset (lapped) relative to the mating faces 51 for connecting web plates 49 in order to form a stronger joint connection to the casting.

Use of the load distributing casting 41, of course, would generally be compromising the structural integrity gained by using a unitary transverse tubular section for the spreader tube. However, the improved draft frame of this invention avoids such a comprise by providing short inner sleeves 55 at opposite ends of casting 41 which are received in the ends of the hollow cross tubes 42 when they are assembled on the casting. Also, the ends 42a of the cross tubes, which are assembled on the casting, can be upset to increase their cross-sectional area in the joint area. Of course their cross-sectional area may be increased in other ways. This procedure generally insures the same structural integrity of the composite spreader tube of this invention as would be obtained using a conventional unitary transverse spreader tube. The casting alternatively could be cast with ring flanges and ring flanges can be also welded to the inboard ends of the cross tubes for connecting the same. Further, the hollow draft frame allows various control systems to pass therethrough, which is desirable.

Field tests have demonstrated that the draft frame described has superior performance to the conventional type, even when the latter is equipped with wrapping plates for reinforcement of the same.

We claim:

1. In an earthmoving scraper having a rigid draft frame which includes a gooseneck, a hitch member connected to one end of said gooseneck, a transverse spreader tube having its central portion connected to the opposite end of said gooseneck, and a pair of parallel draft arms connected to the outboard end of said spreader tube for pivotably connecting the draft frame to opposite sides of a scraper bowl, an improved draft frame comprising:

(a) a unitary central casting having at least two pairs of spaced-apart, flat connecting surfaces wherein at least one pair of said connecting surfaces is substantially perpendicular to at least one other pair of said connecting surfaces;

(b) a gooseneck having pairs of perpendicular structural plate members abutting on said pairs of connecting surfaces on said casting when said gooseneck is joined therewith;

(c) cross tube members rigidly connected to said casting and forming extensions thereof on either side to form a transverse spreader tube; and (d) a draft arm rigidly connected to the outboard end of each said cross tube members.

2. The improved draft frame as defined in claim 1 wherein the gooseneck is connected to the casting by welding the structural members abutting on the connecting surfaces of said casting along their abutting faces.

3. The improved draft frame as defined in claim 2 wherein at least one pair of the connecting surfaces is formed by parallel flanges extending radially outward from the casting.

4. An improved draft frame as defined in claim 2 wherein each pair of the spaced-apart connecting surfaces of the casting are substantially parallel to one another.

5. The improved draft frame defined in claim 2 wherein the unitary central casting is a hollow cylindrical housing having a pair of spaced-apart radially extending flanges protruding from the central portion thereof.

6. An improved draft frame as defined in claim 2 wherein the cross tube members rigidly connected to said casting have their ends so connected upset so as to increase the wall thickness of said tube members at their joints with the casting.

7. The improved draft frame as defined in claim 6 wherein the upset ends of the cross tube members are joined to the casting by a circumferential weld.

References Cited

UNITED STATES PATENTS

| | | |
|---|---|---|
| 2,831,275 | 4/1958 | Kimsey et al. |
| 3,314,176 | 4/1967 | Jones _____ 37—129 |

ABRAHAM G. STONE, *Primary Examiner.*

S. C. PELLEGRINO, *Assistant Examiner.*